United States Patent
Zhang et al.

(10) Patent No.: US 7,092,442 B2
(45) Date of Patent: Aug. 15, 2006

(54) SYSTEM AND METHOD FOR ADAPTIVE FIELD AND FRAME VIDEO ENCODING USING MOTION ACTIVITY

(75) Inventors: Ximin Zhang, Harrison, NJ (US); Anthony Vetro, Staten Island, NY (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 573 days.

(21) Appl. No.: 10/325,986

(22) Filed: Dec. 19, 2002

(65) Prior Publication Data

US 2004/0120397 A1 Jun. 24, 2004

(51) Int. Cl.
*H04N 7/12* (2006.01)
(52) U.S. Cl. ............ 375/240.05; 375/240; 375/240.01; 375/240.02; 375/240.12
(58) Field of Classification Search ........... 375/240.05, 375/240, 240.01, 240.02, 240.03, 240.12, 375/240.14, 240.16, 240.04; 382/250
See application file for complete search history.

(56) References Cited

U.S. PATENT DOCUMENTS

| | | | | |
|---|---|---|---|---|
| 5,168,357 A | 12/1992 | Kutka | ...................... | 358/135 |
| 5,227,878 A | 7/1993 | Puri | ........................... | 358/136 |
| 5,434,622 A | 7/1995 | Lim | ........................... | 348/400 |
| 5,485,279 A * | 1/1996 | Yonemitsu et al. | .... | 375/240.14 |
| 5,737,020 A | 4/1998 | Hall | ........................... | 348/403 |
| 5,878,166 A | 3/1999 | Legall | ........................ | 382/232 |
| 6,094,225 A * | 7/2000 | Han | ........................ | 375/240.16 |
| 6,226,327 B1 | 5/2001 | Igarashi | ...................... | 375/240 |
| 6,243,418 B1 * | 6/2001 | Kim | ...................... | 375/240.12 |
| 6,445,828 B1 * | 9/2002 | Yim | ........................... | 382/250 |
| 6,466,621 B1 | 10/2002 | Coughnard | ................. | 375/240 |

* cited by examiner

*Primary Examiner*—Allen Wong
(74) *Attorney, Agent, or Firm*—Dirk Brinkman; Andrew J. Curtin (57) ABSTRACT

A method adaptively encodes a video including a sequence of images, where each image is a picture of two fields. Each image is first separated into a top-field and a bottom-field. Motion activity is extracted from the top-field and the bottom-field, and each image is encoded using either frame encoding or field encoding depending on the extracted motion activity.

8 Claims, 12 Drawing Sheets

| Org\Ref | I-top | I-bot | P-top | P-bot | B-top | B-bot |
|---|---|---|---|---|---|---|
| Pre-top | No | No | Yes | Yes | Yes | Yes |
| Pre-bot | No | No | Yes | Yes | Yes | Yes |
| Cur-top | No | No | No | No | No | No |
| Cur-bot | No | No | No | No | No | No |

FIG. 4B

| Org\Ref | I-top | I-bot | P-top | P-bot | B-top | B-bot |
|---|---|---|---|---|---|---|
| Pre-top | No | No | Yes | No | Yes | No |
| Pre-bot | No | No | Yes | Yes | Yes | Yes |
| Cur-top | No | Yes | No | Yes | No | Yes |
| Cur-bot | No | No | No | No | No | No |

PRIOR ART

SYSTEM AND METHOD FOR ADAPTIVE FIELD AND FRAME VIDEO ENCODING USING MOTION ACTIVITY

FIELD OF THE INVENTION

This invention relates generally to the field of video compression, and more particularly to selecting field or frame level encoding for interlaced bitstreams based on content.

BACKGROUND OF THE INVENTION

Video compression enables storing, transmitting, and processing audio-visual information with fewer storage, network, and processor resources. The most widely used video compression standards include MPEG-1 for storage and retrieval of moving pictures, MPEG-2 for digital television, and MPEG-4 and H.263 for low-bit rate video communications, see ISO/IEC 11172-2:1991. "Coding of moving pictures and associated audio for digital storage media at up to about 1.5 Mbps," ISO/IEC 13818-2:1994, "Information technology—generic coding of moving pictures and associated audio," ISO/IEC 14496-2:1999, "Information technology—coding of audio/visual objects," and ITU-T, "Video Coding for Low Bitrate Communication," Recommendation H.263, March 1996.

These standards are relatively low-level specifications that primarily deal with a spatial compression of images or frames, and the spatial and temporal compression of sequences of frames. As a common feature, these standards perform compression on a per image basis. With these standards, one can achieve high compression ratios for a wide range of applications.

Interlaced video is commonly used in scan format television systems. In an interlaced video, each image of the video is divided into a top-field and a bottom-field. The two interlaced fields represent odd- and even-numbered rows or lines of picture elements (pixels) in the image. The two fields are sampled at different times to improve a temporal smoothness of the video during playback. Compared to a progressive video scan format, an interlaced video has different characteristics and provides more encoding options.

Figure 1:
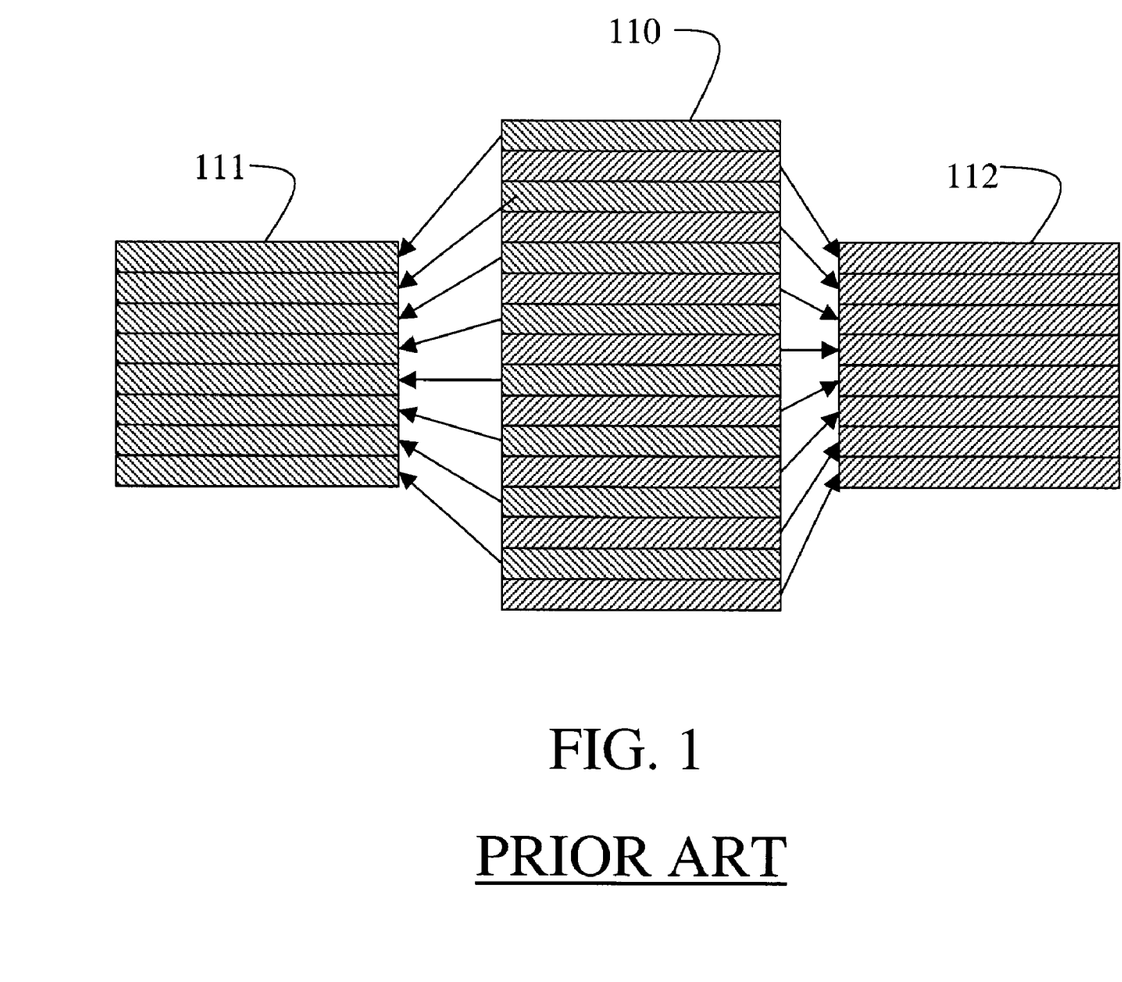
FIG. 1 is a block diagram of a frame and field based macroblock.

As shown in FIG. 1, one 16×16 frame-based macroblock 110 can be partitioned into two 16×8 field-based blocks 111–112. In this way, a discrete cosine transform (DCT) can be applied to either frames or fields of the video. Also, there is a significant flexibility in the way that blocks in the current frame or field are predicted from previous frames or fields. Because these different encoding options provide different compression efficiencies, an adaptive method for selecting a frame encoding mode or a field encoding mode is desirable.

Frame and field encoding tools included in the MPEG-2 standard are described by Puri et al., "Adaptive Frame/Field Motion Compensated Video Coding," Signal Processing: Image Communications, 1993, and Netravali et al., "Digital Pictures: Representation Compression and Standards," Second Edition, Plenum Press, New York, 1995. Adaptive methods for selecting picture level encoding modes are not described in those two references.

U.S. Pat. No. 5,168,357, "Method for a calculation of a decision result for a field/frame data compression method," issued on Dec. 1, 1992 to Kutka, describes a method for deciding a transform type for each 16×16 macroblock of an HDTV video, specifically, the selection between a 16×16 frame block DCT or a 16×8 field block DCT. In that method, differences between pairs of field pixels of two lines of the same field are absolutely summed up to form a field sum. Likewise, differences between pairs of frame pixels of two lines of the frame are absolutely summed up to form a frame sum. The frame sum multiplied by a frame weighting factor is subtracted from the field sum to form a decision result. If the decision result is positive, then the frame is encoded; otherwise, the two fields are encoded separately.

U.S. Pat. No. 5,227,878, "Adaptive coding and decoding of frames and fields of video," issued on Jul. 13, 1993 to Puri et al., describes a video encoding and decoding method. In that method, for frame encoding, four 8×8 luminance subblocks are formed from a macroblock; for field encoding, four 8×8 luminance subblocks are derived from a macroblock by separating the lines of the two fields, such that each subblock contains only lines of one field. If the difference between adjacent scan lines is greater than the differences between alternate odd and even scan lines, then field encoding is selected. Otherwise, frame encoding is selected. An 8×8 DCT is then applied to each frame subblock or field subblock, depending on the mode selected.

U.S. Pat. No. 5,434,622, "Image signal encoding apparatus using adaptive frame/field format compression," issued on Jul. 18, 1995 to Lim, describes a procedure for selecting between frame and field format compression on a block-by-block basis. In that procedure, the selection is based on the number of bits used for each block corresponding to the specified encoding format. The distortion of the corresponding block is not considered. A compression scheme is not provided.

U.S. Pat. No. 5,737,020, "Adaptive field/frame encoding of discrete cosine transform," issued on Apr. 7, 1998 to Hall and et al, describes a method of DCT compression of a digital video image. In that method, the field variance and frame variance are calculated. When the field variance is less than the frame variance, field DCT type compression is performed. Alternatively, when the frame variance is less than the field variance, then a frame DCT compression is performed.

U.S. Pat. No. 5,878,166, "Field frame macroblock encoding decision," issued on Mar. 2, 1999 to Legall, describes a method for making a field frame macroblock encoding decision. The frame based activity of the macroblock is obtained by summing absolute differences of horizontal pixel pairs and absolute differences of vertical pixel pairs. The result is summed over all the blocks in the macroblock. The first and second field-based activity are obtained similarly. The mode with less activity is selected.

U.S. Pat. No. 6,226,327, "Video coding method and apparatus which select between frame-based and field-based predictive modes," issued on May 1, 2001 to Igarashi et al. describes an image as a mosaic of areas. Each area is encoded using either frame-based motion compensation of a previously encoded area, or field-based motion compensation of a previously encoded area, depending on the result that yields the least amount of motion compensation data. Each area is orthogonally transformed using either a frame-based transformation or a field-based transformation, depending on the result that yields the least amount of motion compensation data.

The above cited patents all describe methods in which an adaptive field/frame mode decision is used to improve the compression of the interlaced video signal using macroblock based encoding methods. However, only local image information or the number of the bits needed for the encoding is used to select the DCT type and motion prediction mode of the local macroblock. None of the those methods consider the global content when making encoding decisions.

Figure 2:
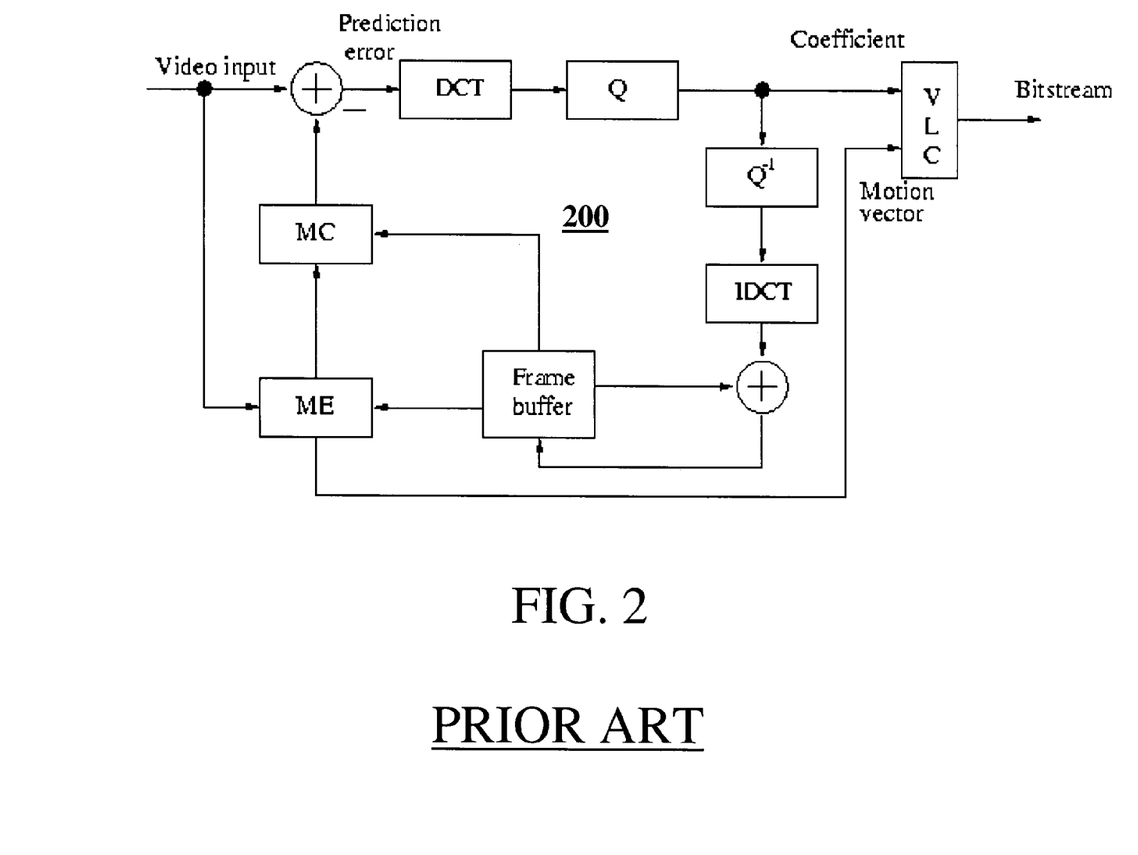
FIG. 2 is a block diagram of a prior art video encoder.

FIG. 2 shows a well known architecture 200 for encoding a video according to the MPEG-2 encoding standard. A frame of an input video is compared with a previously decoded frame stored in a frame buffer. Motion compensation (MC) and motion estimation (ME) are applied to the previous frame. The prediction error or difference signal is DCT transformed and quantized (Q), and then variable length coded (VLC) to produce an output bitstream.

Figure 3:
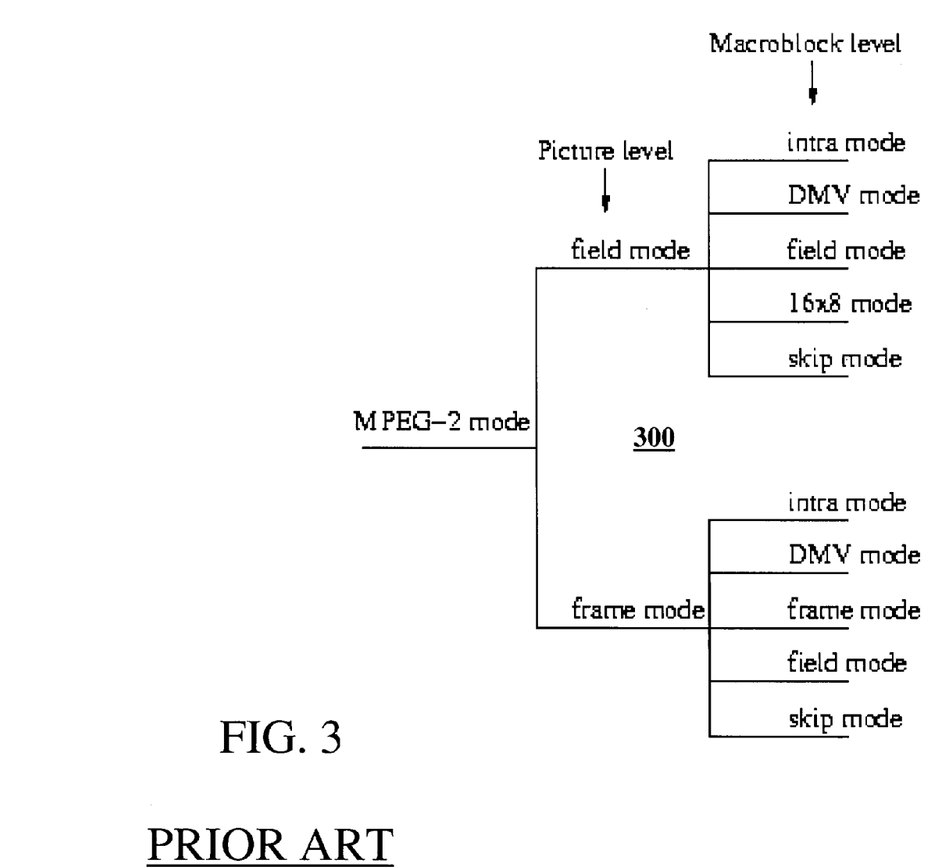
FIG. 3 is a block diagram of prior art MPEG-2 encoding mode options.

As shown in FIG. 3 for the MPEG-2 standard mode encoding 300, motion estimation for each frame is encoded by either frame-coding or field-coding modes. With a given frame level mode, there are various associated macroblock modes. FIG. 3 shows the relationship between picture encoding modes, and macroblock encoding modes at the picture level, and the block level.

MPEG-2 video encoders can use either frame-only encoding, where all the frames of a video are encoded as frames, or field-only encoding, where each frame is encoded as two fields, and the two fields of a frame are encoded sequentially. In addition to the picture level selection, a selection procedure at the macroblock level is used to select the best macroblock-coding mode, i.e., intra, DMV, field, frame, 16×8, or skip mode. One important point to make is that the macroblock modes are not optimized unless the frame level decision is optimized.

Figure 4A:
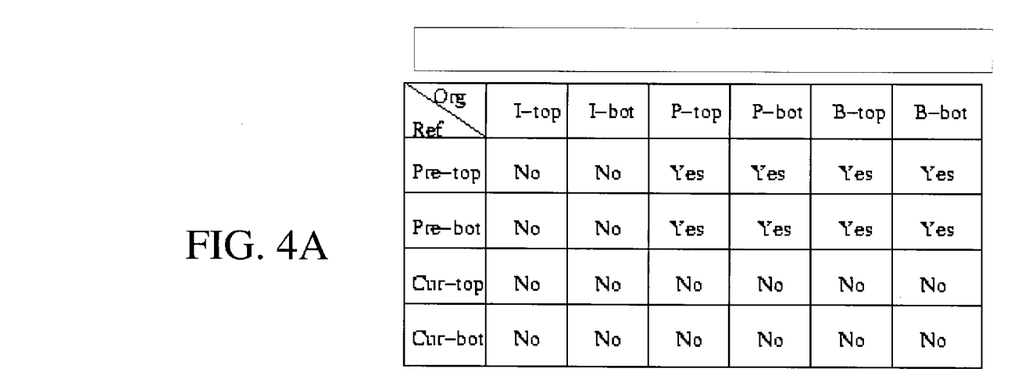
FIGS. 4A–B are tables of mode options for field predictions with frame pictures and field predictions with field pictures.
Figure 4B:
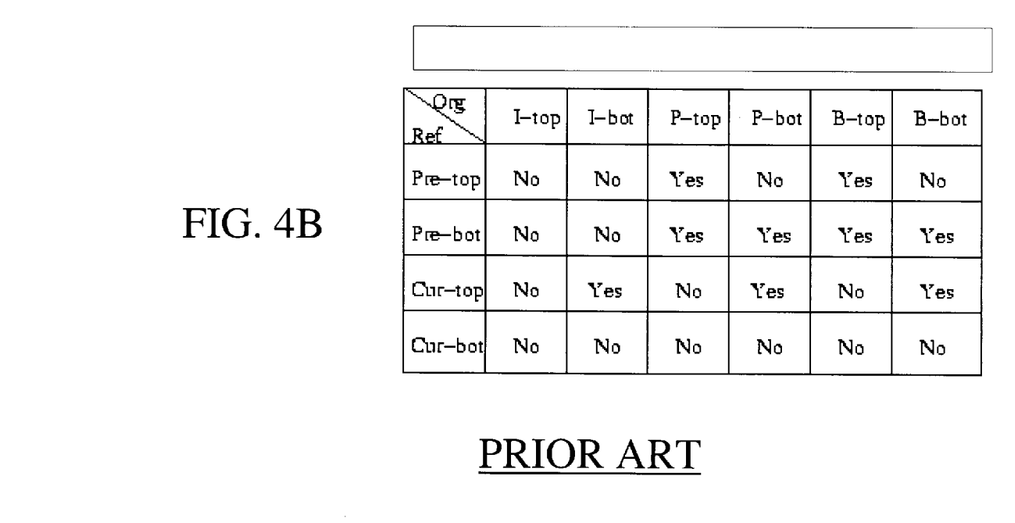

FIGS. 4A and 4B show how a macroblock for a current (cur) frame can be predicted using a field prediction mode in frame pictures, or a field prediction mode in field pictures, respectively, for I-, P-, and B-fields. The adaptive mode decision based on the options in FIG. 4A is referred to as adaptive field/frame encoding. However, there the encoding is only at the macroblock-level, which is less than optimal due to mode restrictions.

For instance, in that macroblock-based selection, the second I-field can only be encoded with intra mode, and the P-field and B-field can only be predicted from the previous frame. On the other hand, if the frame level mode is field-only, then the second I-field can be encoded with inter mode and predicted from the first I-field; the second P-field can predicted from the first P field, even if field is located in the same frame.

Figure 5:
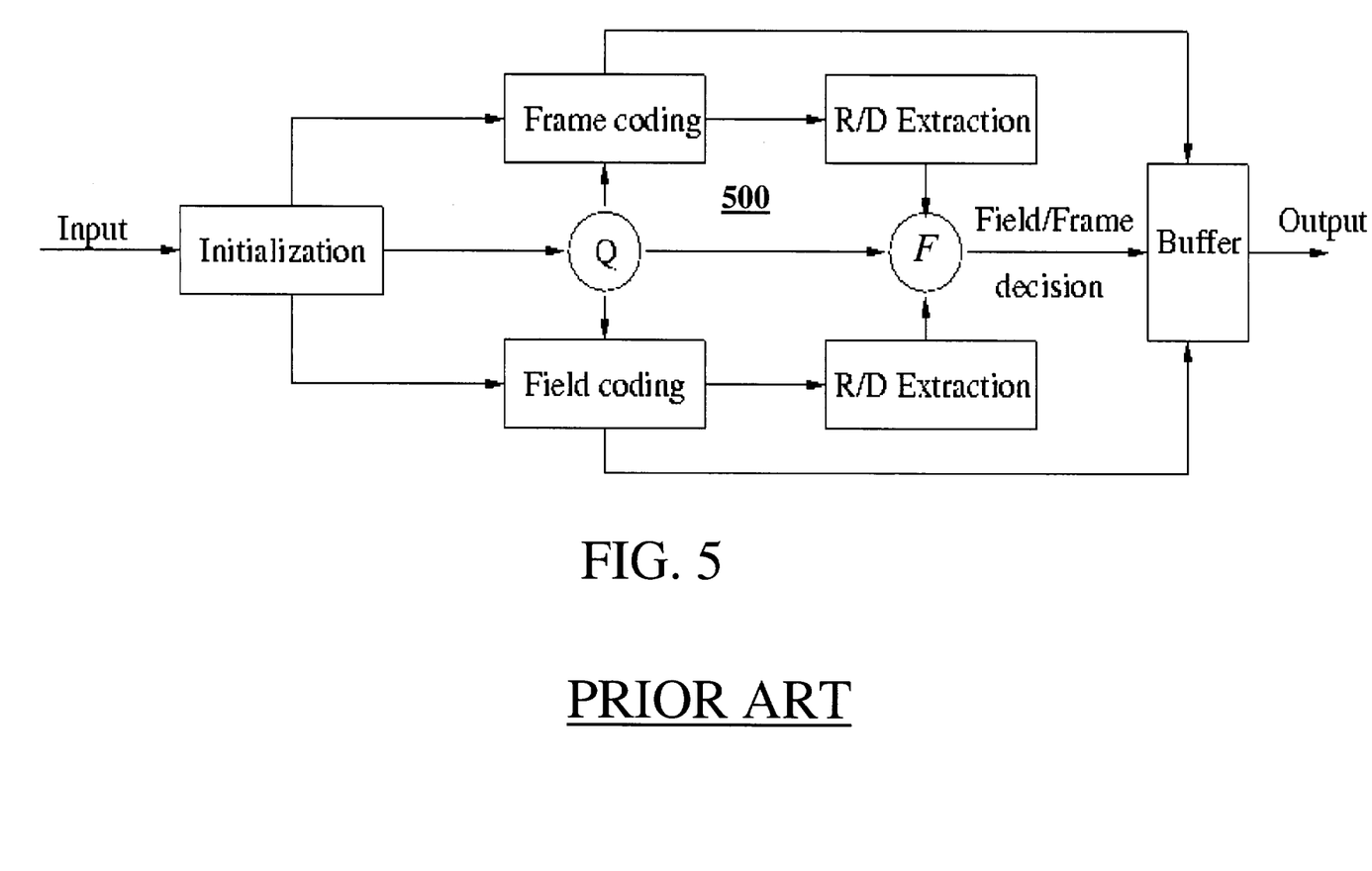
FIG. 5 is a block diagram of a prior art two-pass serial encoding method.

FIG. 5 shows a two pass macroblock frame/field encoding method 500 that solves the problems associated with the encoding according to FIG. 4. That method has been adopted by the Joint Video Team (JVT) reference code, see ISO/IEC JTC1/SC29/WG11 and ITU-T SG16 Q.6, "Adaptive Frame/Field Coding for JVT" in JVT-B071. In that method, the input is first encoded by frame mode. The distortion and bit rate (R/D) are extracted and saved. The frame is then encoded by field mode. The corresponding distortion and bit rate are also recorded. After that, a function (F) compares the costs of the two encoding modes. The mode with smaller cost is then selected to encode the video as output.

The method 500 has several problems. The method requires two-passes and uses a fixed predetermined quantization (Q). Consequently, the JVT standard method requires a significant amount of computation for each frame and is less suitable for encoding a video in real-time.

Figure 6:
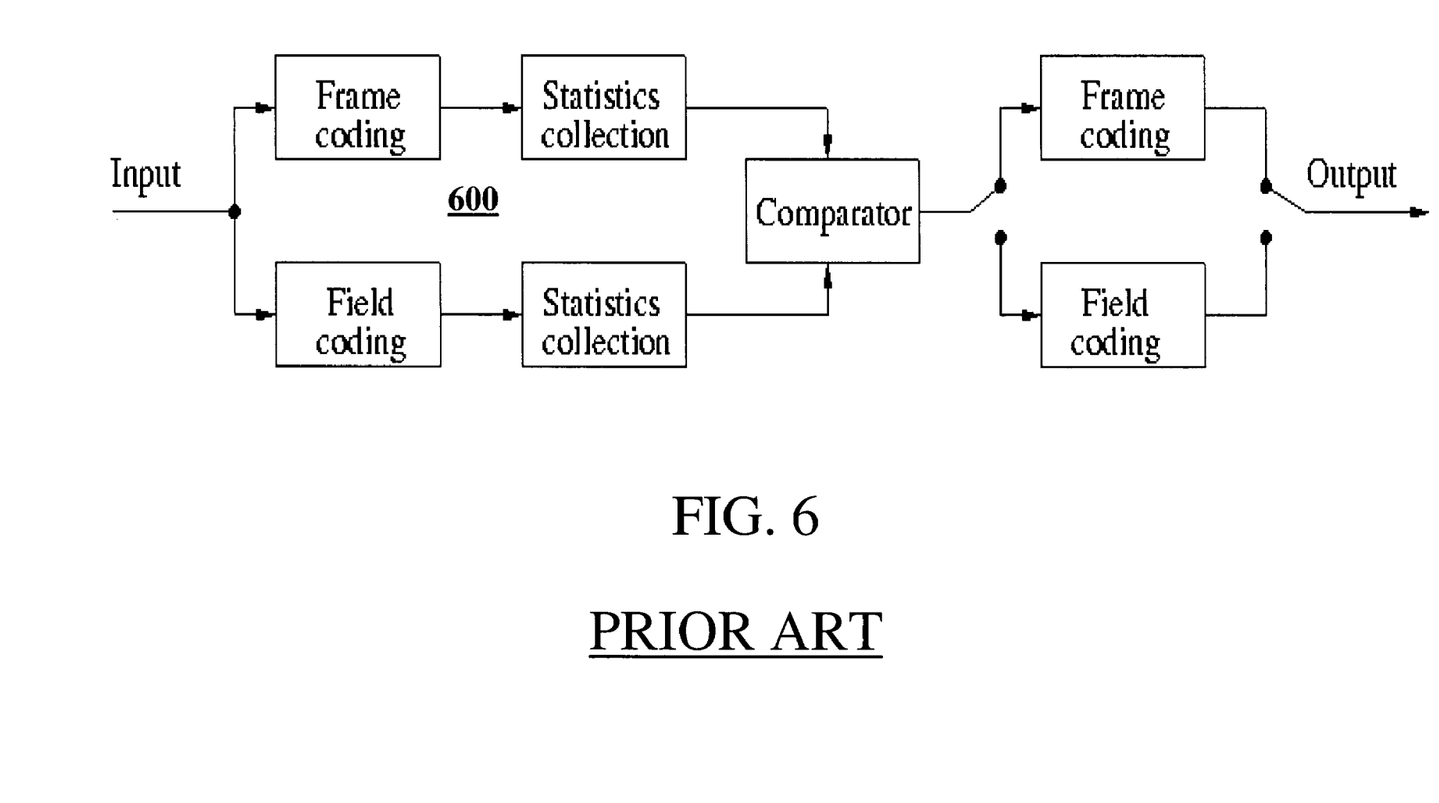
FIG. 6 is a block diagram of a prior art two-pass parallel encoding method.

U.S. Pat. No. 6,466,621, "Video coding method and corresponding video coder," issued on Oct. 15, 2002 to Cougnard, et al. describes a different type of two-pass encoding method 600. The block diagram of that method is shown in FIG. 6. In the first pass, each frame of the input is encoded in parallel paths using the field encoding mode and the frame encoding mode. During the first pass, statistics are extracted in each path, i.e., the number of bits used by each co-positional macroblock in each mode, and the number of field motion compensated macroblocks. The statistics are compared, and a decision to encode the output in either field or frame mode is made. In the second pass, the frame is re-encoded according to the decision and extracted statistics.

The prior art field/frame encoding methods do not address rate control or motion activity. Therefore, there is a need for an adaptive field/frame encoding method with effective rate control considering motion activity.

SUMMARY OF THE INVENTION

A method adaptively encodes a video including a sequence of images, where each image is a picture of two fields. Each image is first separated into a top-field and a bottom-field. Motion activity is extracted from the top-field and the bottom-field, and each image is encoded using either frame encoding or field encoding depending on the extracted motion activity.

DETAILED DESCRIPTION OF PREFERRED EMBODIMENTS

Introduction

Interlaced videos include two fields scanned at different times. In frame or field encoding according to the MPEG-2 standard, an interlaced video is typically encoded as either frame-only or field-only structure, irrespective of the content.

However, frame-only encoding may be better suited for some segments of the video, while other segments favor field-only encoding. Hence, either frame-only or field-only encoding, as done in the prior art, leads to encoding inefficiency.

In adaptive frame and field encoding according to the invention, the frame or field encoding decision is made at the image level. An input image can be encoded as one frame or two fields by jointly considering content distortion characteristics and any external constraints such as the bit-rate.

For the adaptive encoding according to the invention, a header indicates whether the current image is encoded as one frame or two fields. For field-only encoding, two fields of a frame are encoded sequentially. If the frame type is intra (I-type), then the frame is divided into one I-field and one P-field. If the frame type is inter (P-type or B-type), then the frame is divided into two P-fields or two B-fields.

In the following, we first describe an adaptive field/frame encoding method under a bit rate constraint.

In a two-pass method, we encode each image of the interlaced video using either field-only mode or frame-only mode. Rate-distortion (R-D) control is applied to each pass, then a cost function is constructed for corresponding R-D values, and the encoding decision is made based on the R-D values.

In a one-pass method, content characteristics of two fields are extracted and considered jointly before the encoding. After the encoding mode decision is made, the frame is encoded. In this way, only one pass is needed.

Results show that both of our one-pass and two-pass adaptive encoding methods guarantee better performance than the frame-only and field-only encoding methods of the prior art.

Two-Pass Adaptive Field/Frame Encoding Method

Figure 7:
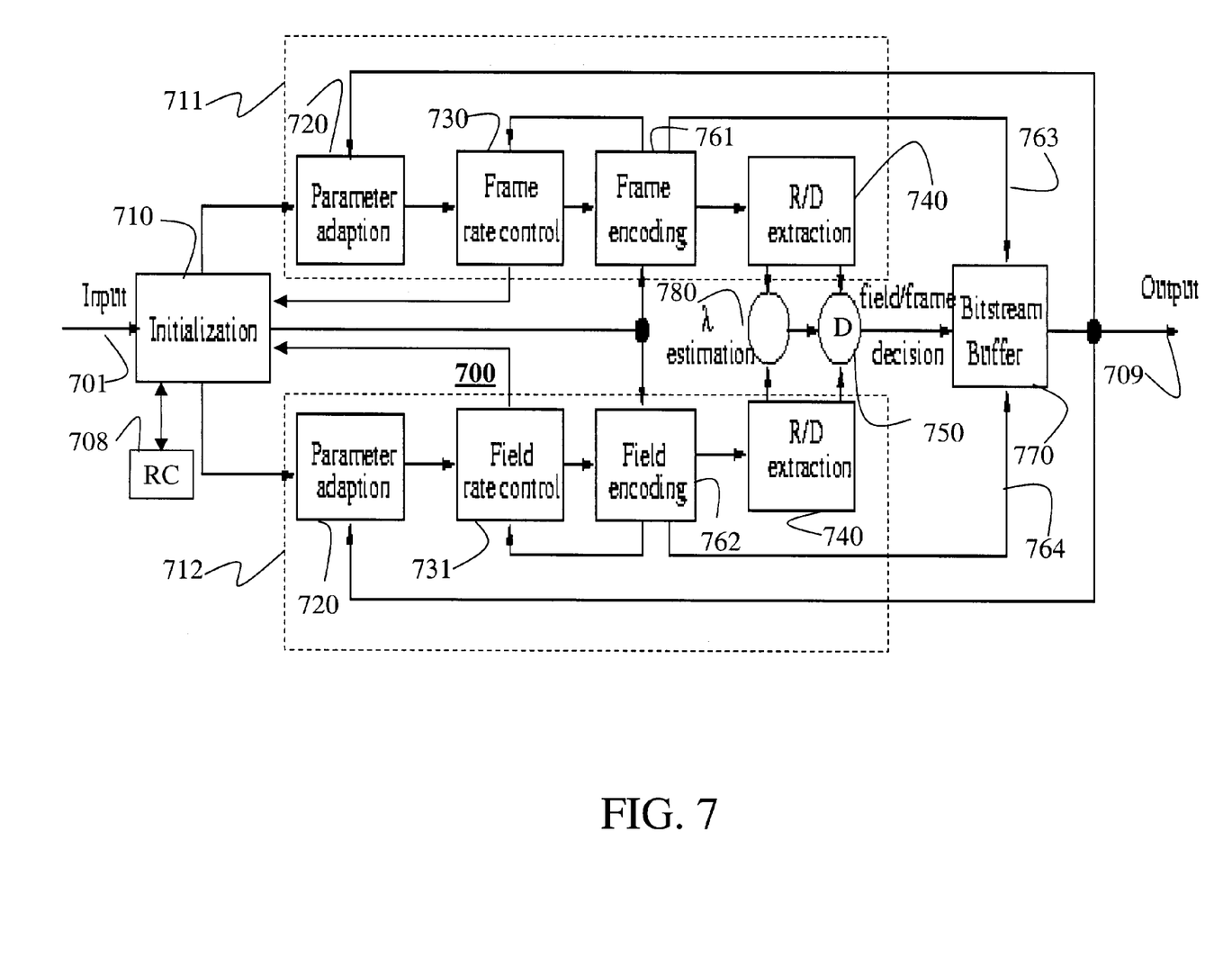
FIG. 7 is a block diagram of a two-pass video encoder with adaptive field/frame encoding according to the invention.

FIG. 7 shows the two-pass adaptive field/frame encoding scheme 700 according to our invention. In this method, the first image of the input video 701 is used to initialize 710 encoding parameters, such as the size of the image, and the number of P- and B-frames remaining in a group of pictures (GOP).

Subsequently, a reference frame for motion estimation, the number of bits left in two bitstream buffers 770, and the number of bits used are determined. The current image is then encoded as output 709 using two paths 711–712, one for frames, and the other for fields.

In both the frame and field paths, the parameters are adapted 720 continuously. After all of the parameters are fixed, the current image is encoded using frame-only encoding in the frame path 711, and field-only encoding in the field path 712.

In path 711, frame rate control 730 is applied, and in path 712 field rate control 731. The rate controls are applied according to a bit rate budget for the current image. The generated bitstreams are stored separately in the two buffers 770. The number of bits used for the current image is recorded respectively for the two paths.

We extract 740 rates and distortions for the two paths from the reconstructed images. The two distortion values and the corresponding bits used determine 780 a cost function parameter $\lambda$, and construct a decision (D) 750 in the form of a cost function. The value of the cost function is then used to select frame encoding 761 or field encoding 762 for the current image.

After the decision 750 is made, either the frame encoded bitstream 763 or field encoded bitstream 764 is selected as the output 709. The output 709 is fed back to the parameter adaptation block 720 for the encoding of next frame. In our two-pass method 700, the criterion for selecting either frame or field encoding per image is entirely based on joint rate-distortion (R-D) characteristics of the video content.

Rate-Distortion Decision

Prior art encoding methods based on rate allocation have attempted to minimize either the rate on distortion constraint, or the distortion on rate constraint.

By using a Lagrange multiplier technique, we minimize an overall distortion with the cost function $J(\lambda)$ in Equation (1), $$J(\lambda) = \sum_{i=0}^{N-1} D_i(R_i) + \lambda \sum_{i=0}^{N-1} R_i \text{ subject to } \sum_{i=0}^{N-1} R_i \leq R_{budget}, \quad (1)$$

where N is the total frames in the input video 701.

If field-only mode is used for encoding one image, then fewer bits may be required than with frame-only mode. However, the distortion of this image may be worse than if frame-only mode was used. Our optimal decision is based on both the distortion and the rate of the global content of the video.

In our invention, we use a similar approach for rate allocation. A cost is defined by Equation (2) as $$\text{cost=Distortion}+\lambda\text{rate}. \quad (2)$$

If cost(frame)<cost(field), we select the frame encoding 761, and field encoding 762 otherwise. To determine a suitable parameter $\lambda$ 780, we model the R-D relationship. We use an exponential model as given by Equation (3), $$D(R)=a\sigma^2 2^{-2R}. \quad (3)$$

For further information on the above relationship, see Jayant and Noll, *Digital Coding of Waveforms*, Prentice Hall, 1984.

Applying this model to the above cost function $J(\lambda)$, the parameter $\lambda$ can be obtained by Equation (4) as $$\lambda=2a\sigma^2 2^{-2R_i} \ln 2=2D(R_i)\ln 2, \quad (4)$$

where $R_i$ denotes the optimal rate allocated to frame i.

Therefore, we use the distortion of the current encoded frame to estimate the value of the parameter $\lambda$. In our invention, Equation (5) is used to estimate the cost function parameter $\lambda$ for the first frame.

$$\lambda=(D_{frame}(R_{frame})+D_{field}(R_{field}))\ln 2. \quad (5)$$

Then, we update the parameter $\lambda$ for the following frames according to Equation (6).

$$\lambda=W_1 \cdot \lambda_{current}+W_2 \cdot \lambda_{previous} \quad (6)$$

In Equation (6), the current parameter $\lambda_{current}$ is calculated by using Equation (5), a previous parameter $\lambda_{previous}$ is the estimate $\lambda$ of the previous frame, and $W_1$ and $W_2$ are weights, where $W_1+W_2=1$. It is noted that the calculation for an I-frame is based on Equation (5) only.

The key differences between prior art method and our novel method are as follows.

In the prior art method as shown in FIG. 5, a fixed quantization is used, while in the method according to the invention, an adaptive quantization is used. Also, in the prior art method, the parameter $\lambda$ in the cost function depends on the knowledge of the quantization, while in our method, the parameter $\lambda$ in the cost function is independent of the quantization.

The prior art cannot perform real-time rate control with fixed quantization because it is impossible to estimate motion and texture information before encoding. The parameters in our method are obtained from the encoding result, where the scale of the quantizer can be adapted according to a rate control strategy described further below. Therefore, the invention achieves effective rate control.

In the following, we describe a rate-control procedure for the two-pass adaptive field/frame method 700.

Rate Control for the Adaptive Two-Pass Encoding Method

Many rate control methods are described for MPEG coding techniques, including prior art two-pass rate control methods that use the first pass to collect information, and the second pass to apply rate control. That method is totally different than our two-pass method, where the rate control is applied concurrently to both paths, and is based on the same set of parameters transferred from a previous frame.

The prior art rate control methods have not considered encoding mode transitions during the encoding process. For instance, the well-known TM5 rate control method does not adapt its parameters when transitioning from frame-to-field or field-to-frame. Therefore, an optimal bit allocation per field or frame cannot be achieved with prior art techniques.

According to our invention, we do not use quantization information in our two-pass method. Consequently, we provide effective rate control within the context of our method. In the following, we describe an effective constant bit-rate (CBR) rate control procedure for our two-pass method.

Initialize a rate budget R, I-frame activity $X_i$, P-frame activity $X_p$, B-frame activity $X_b$, I-frame buffer fullness $d0_i$, P-frame buffer fullness $d0_p$ and B-frame buffer fullness $d0_b$ by using the frame encoding 761. All of the above rate control parameters are stored in a rate controller (RC) 708, which is accessible by the initialization block 710.

If the current frame is the first in a GOP, determine the number $N_p$ of P-frames in the current GOP, the number $N_b$ of B-frames in the current GOP, then perform the following steps.

For the frame path 711, encode the current frame by using frame encoding 761, TM5 rate control, and the parameters stored in the rate controller. Store the updated rate control parameters in a buffer $Bu_{frame}$.

For the field path 712, let $N_p=2 \times N_p+1$, $N_b 2 \times N_b$, and encode the current frame by using field encoding 762, TM5 rate control and the parameters stored in the rate controller 708. Store the updated rate control parameters in a buffer $Bu_{field}$.

If frame encoding is selected, then update the parameters in the rate controller by using the data stored in $Bu_{frame}$; and if field encoding is selected, then update the parameters in the rate controller by using the data in $Bu_{field}$.

If the current frame is not the first in the GOP, then perform the following steps.

For the frame path 711, if the previous picture adopt frame mode, use the current value of $N_p$ and $N_b$, or let $N_p=N_p/2$, $N_b=N_b/2$, encode the current frame by using frame encoding, TM5 rate control and the parameters stored in the rate controller, and replace the contents in $Bu_{frame}$ with the updated rate control parameters.

For the field path 712, if the previous image is encoded in field mode, use the current value of $N_p$ and $N_b$, or let $N_p=(N_p+1) \times 2$, $N_b=(N_b+1) \times 2$, and encode the current frame by using field encoding, TM5 rate control and the parameters stored in the rate controller, and replace the contents in $Bu_{field}$ with the updated rate control parameters.

If frame encoding mode is selected, then update the parameters stored in the rate controller by using the data in $Bu_{frame}$; and if field encoding mode is selected, then update the parameters stored in the rate controller by using the data in $Bu_{field}$.

By using our two-pass adaptive field/frame encoding method, improved encoding efficiency is obtained. However, in the two-pass method, the encoding time is almost twice of the traditional MPEG-2 encoder. For some applications, with limited resources and sensitivity to the delays, a low complexity adaptive field/frame encoding method is desired.

One-Pass Adaptive Field/Frame Encoding Method

According to the analysis above, the decision to encode a field or frame is directly related to the motion of each frame. Also, the amount of motion can be approximated by the difference between the pixel characteristics, specifically the correlation among the top and bottom fields. Motivated by these observations, we describe a one-pass adaptive field/frame encoding method.

In the MPEG-2 standard, I-frames consist of two fields. We denote them as I-top and I-bottom, where I-top includes all of the odd scan lines and I-bottom includes all of the even scan lines, see FIG. 1. If the current image is set to field mode, then either the top-field or the bottom-field is set as the first field, and a header is added to indicate whether the current field is first or second.

By using field mode, the second field can be encoded from the first field as inter and predicted. We have found that it is always more efficient to predict the second I-field from the first I-field, rather than encoding the entire I-frame as intra. Based on this observation, the frame encoding mode for I-frames is always set to field in our one-pass method. This does not mean that all of the macroblocks in the second field are encoded using inter mode. According to the macroblock-based mode decision, blocks that encoded more efficiently with intra, can be encoded in that way.

Figure 8:
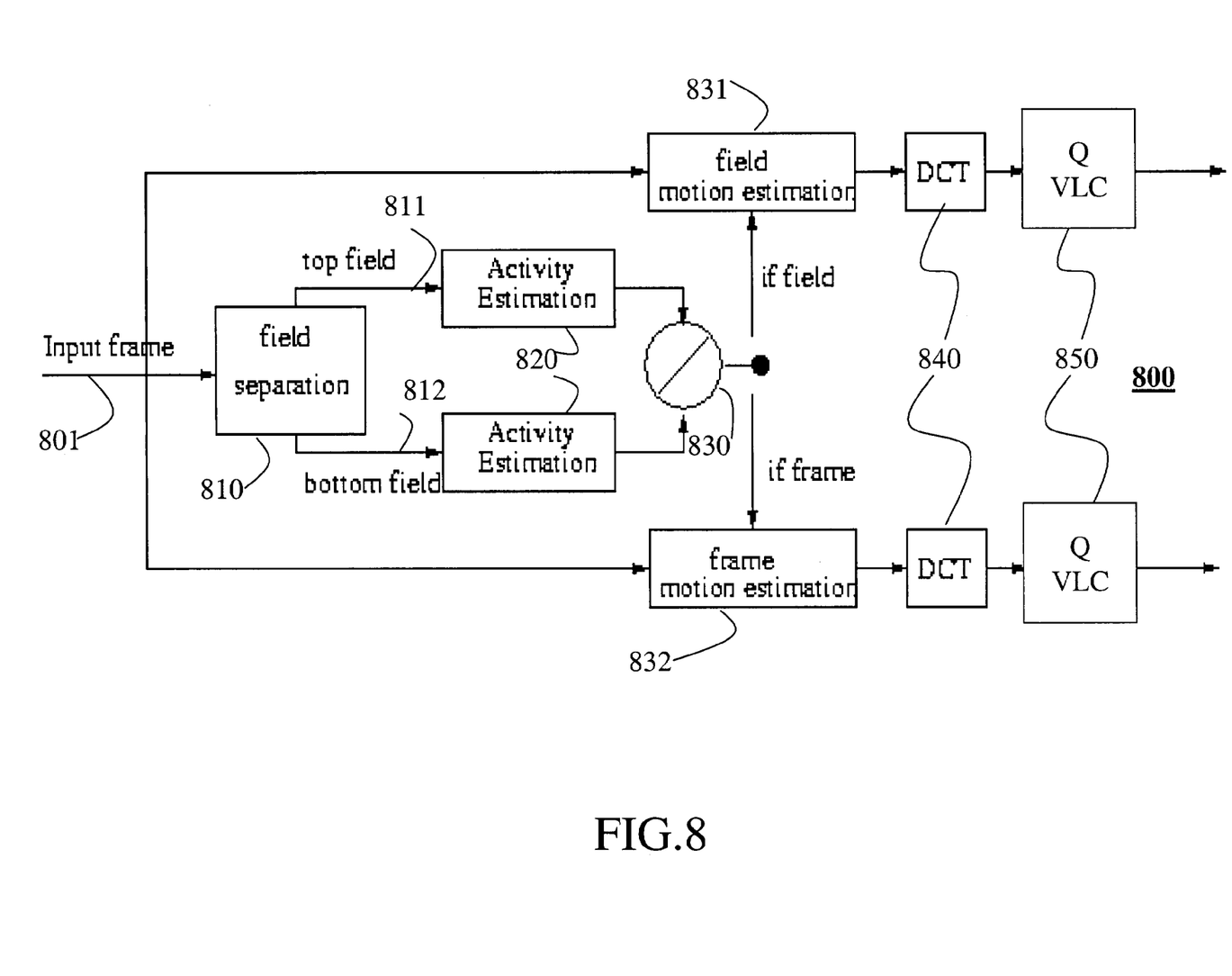
FIG. 8 is a block diagram of a one-pass video encoder with adaptive field/frame encoding according to the invention.

FIG. 8 shows the one-pass adapative field/frame encoding method 800 according to the invention. Images of an input video 801 are sent to a field separator 810 that produces a top-field 811 and a bottom-field 812, see FIG. 1. Motion activity is estimated 820 for each field, where motion activity is described in more detail below. The motion activity for each field is used to select 830 either field-based motion estimation 831 or frame-based motion estimation 832 to encode frames of the input video 801.

Depending on the frame encoding selection 830, encoding of the field-based residue or frame-based residue is encoded via a subsequent DCT 840, and Quantization (Q) and variable length coding (VLC) processes 850.

Accordingly, P-frames are reconstructed from the encoded data and used as reference frames for encoding future frames.

For P-frames and B-frames, we consider each 16×16 macroblock in the current frame. Each macroblock is paritioned into its top-field and bottom-fields. The top-field is a 16×8 block that consists of eight odd lines, and the bottom-field is a 16×8 block that consists of eight even lines. Then, our method implements the following steps:

First, we initialize two counters MB_field and MB_frame to zero. For each 16×16 macroblock, the variance of the top-field and the bottom-field are calculated by $$Var = \sum_i (P_i - E(P_i))^2,$$

where $P_i$ denotes a pixel value and $E(P_i)$ denotes the mean value of the corresponding 16×8 field.

The ratio between the variances is determined. Then, if Var(top-field)/Var(bottom-field)>Threshold$_1$,
MB_field+=1; else if Var(top-field)/Var(bottom-field)<Threshold$_2$, MB_field+=1; else
MB_frame+=1.

After iterating over all macroblocks, the following frame encoding decisions are made.

If MB_field>MB_frame, then field mode is selected; otherwise, if MB_field≦MB_frame, frame mode is selected. Values for the two thresholds are obtained from a collection of typical videos.

In summary, we describe an effective block-based correlation to estimate the motion activities of the current frame in our one-pass method. The motion activity is estimated from a ratio of the block-based variances for each field. In doing so, computationally expensive exact motion estimation is avoided. The decision to encode an image as a frame or as two fields depends on the motion activity of the majority of the macroblocks in the current frame.

Rate Control for One-Pass Adaptive Encoding Method

As stated above, prior art methods do not considered encoding mode transition during the encoding process. However, mode transitioning from frame-to-field or field-to-frame happens often in our adaptive one-pass method. Under these circumstances, the rate-control parameters must be adapted.

The rate-control process for our one-pass method is implemented with the following procedure. We use the TM5 process to control the encoding of the I-frame, i.e., first frame in a GOP, which is always field encoded.

If the current frame uses frame encoding, and if the previous frame uses frame encoding 832, then use the normal procedure of TM5, and if the previous frame uses field encoding 831, let $N_p=N_p/2$, $N_b=N_b/2$, and use TM5.

If the current frame uses field encoding, and if the previous frame uses frame encoding, let $N_p=2\times N_p$, $N_b=2\times N_b$ and use TM5, and if the previous frame uses field encoding, use the normal procedure of TM5.

Results

To validate the effectiveness of our adaptive method, we encode two interlace videos with a standard MPEG-2 encoder. Football is the common video for interlace testing, and Stefan_Football is a GOP-by-GOP concatenated video of Stefan and Football, i.e., one GOP of Stefan, one GOP of Football, one GOP of Stefan, and so on. Football has high motion activity, while Stefan has slow motion activity and panning.

Frame, field and adaptive encoding were performed for each of video separately. A set of five rates were tested per encoding method and per video, i.e., 2 Mbps, 3 Mbps, 4 Mbps, 5 Mbps, and 6 Mbps.

Figure 9A:
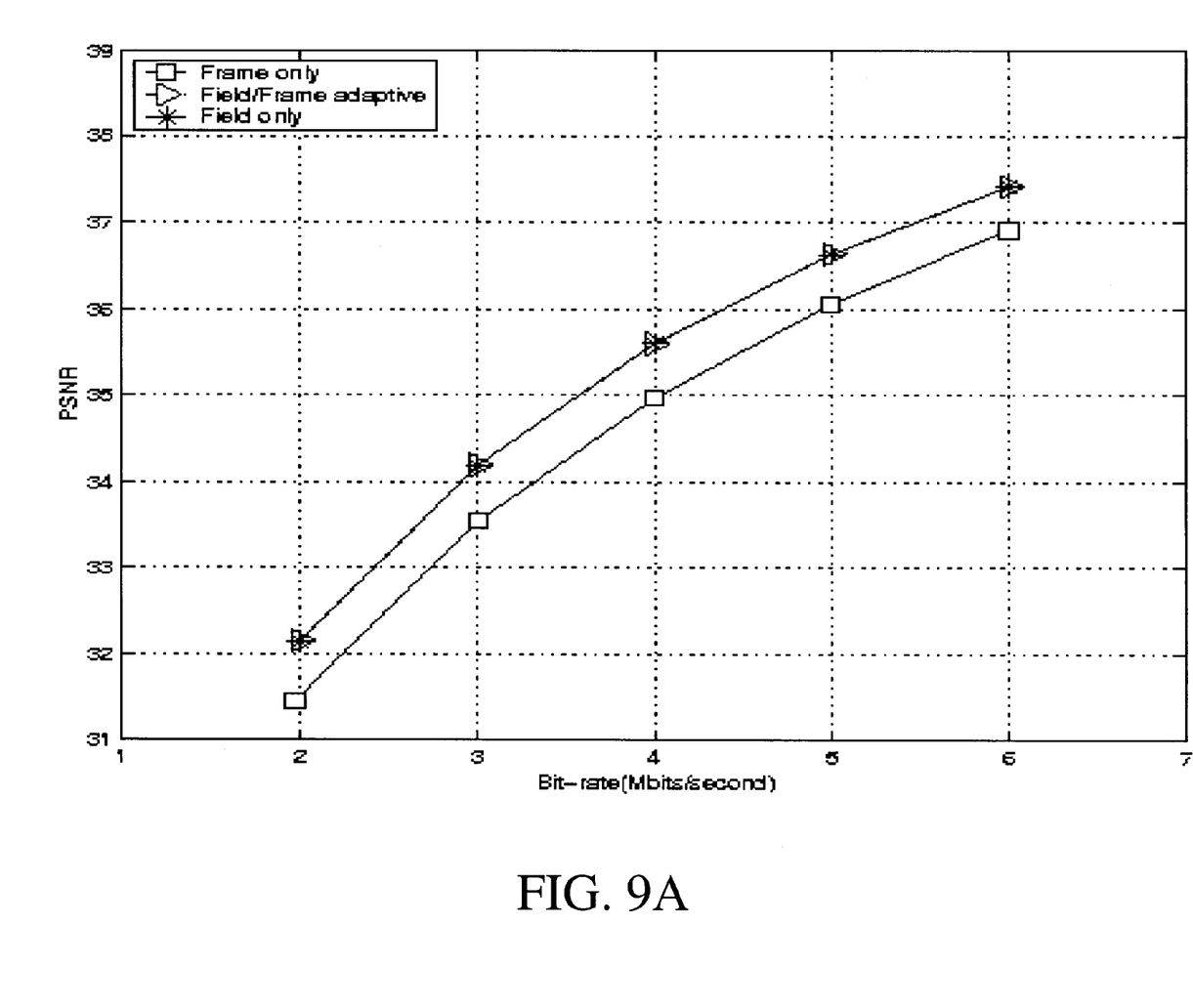
FIG. 9A is a graph comparing decoded qualities over a range of bit-rates of a standard Football video achieved by the two-pass encoder of FIG. 7 and prior art methods.
Figure 9B:
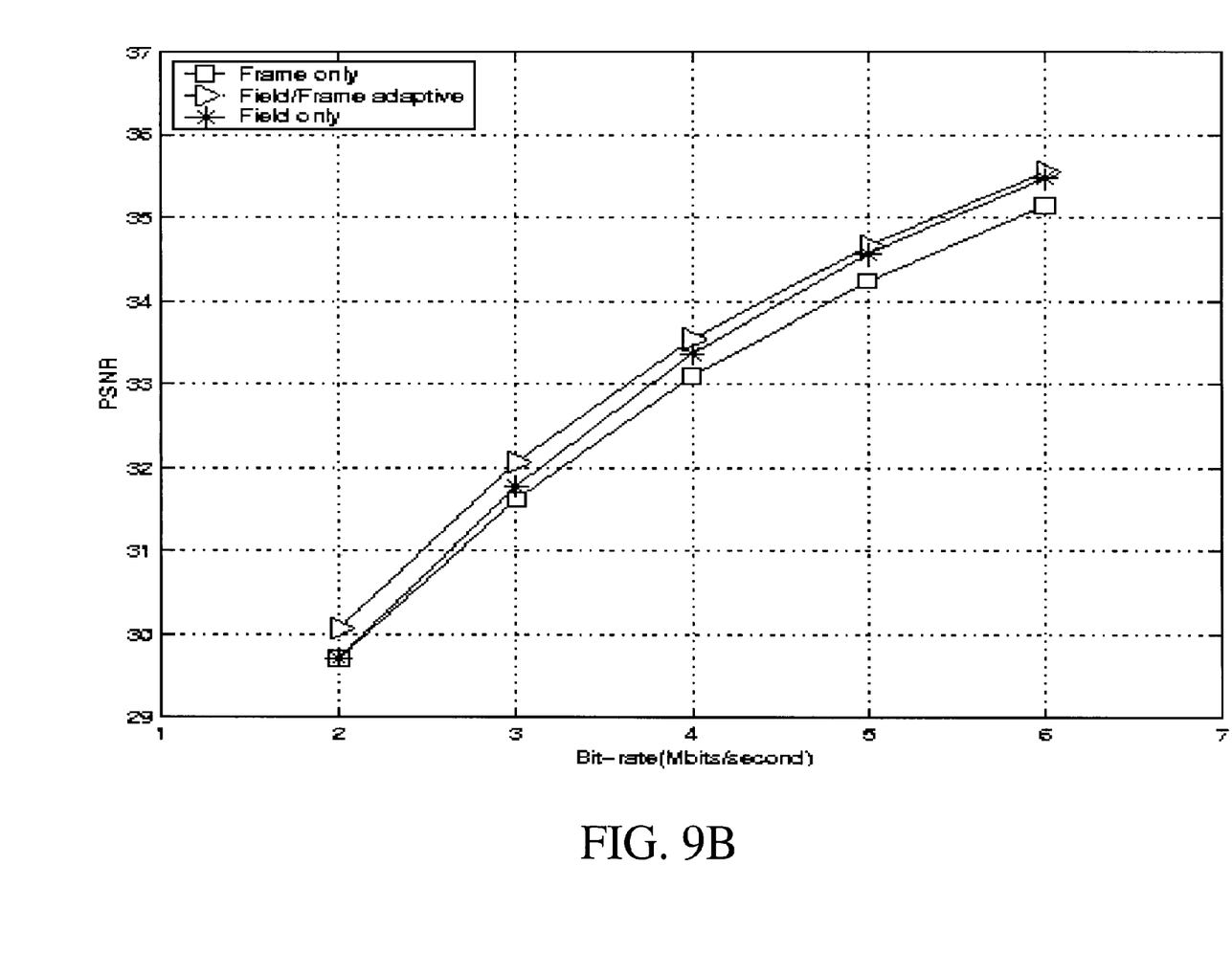
FIG. 9B is a graph comparing decoded quality over a range of bit-rates of a standard Stefan-Football video sequence achieved by the two-pass encoder of FIG. 7 and prior art methods.

FIGS. 9A and 9B compare the performance of our two-pass adaptive field/frame encoding method with frame-only and field-only modes. The PSNR is the average of 120 frames, and it is plotted over different rates. The results indicate that our method obtains equal or better performance than the better of field-only mode and frame-only mode.

Figure 10A:
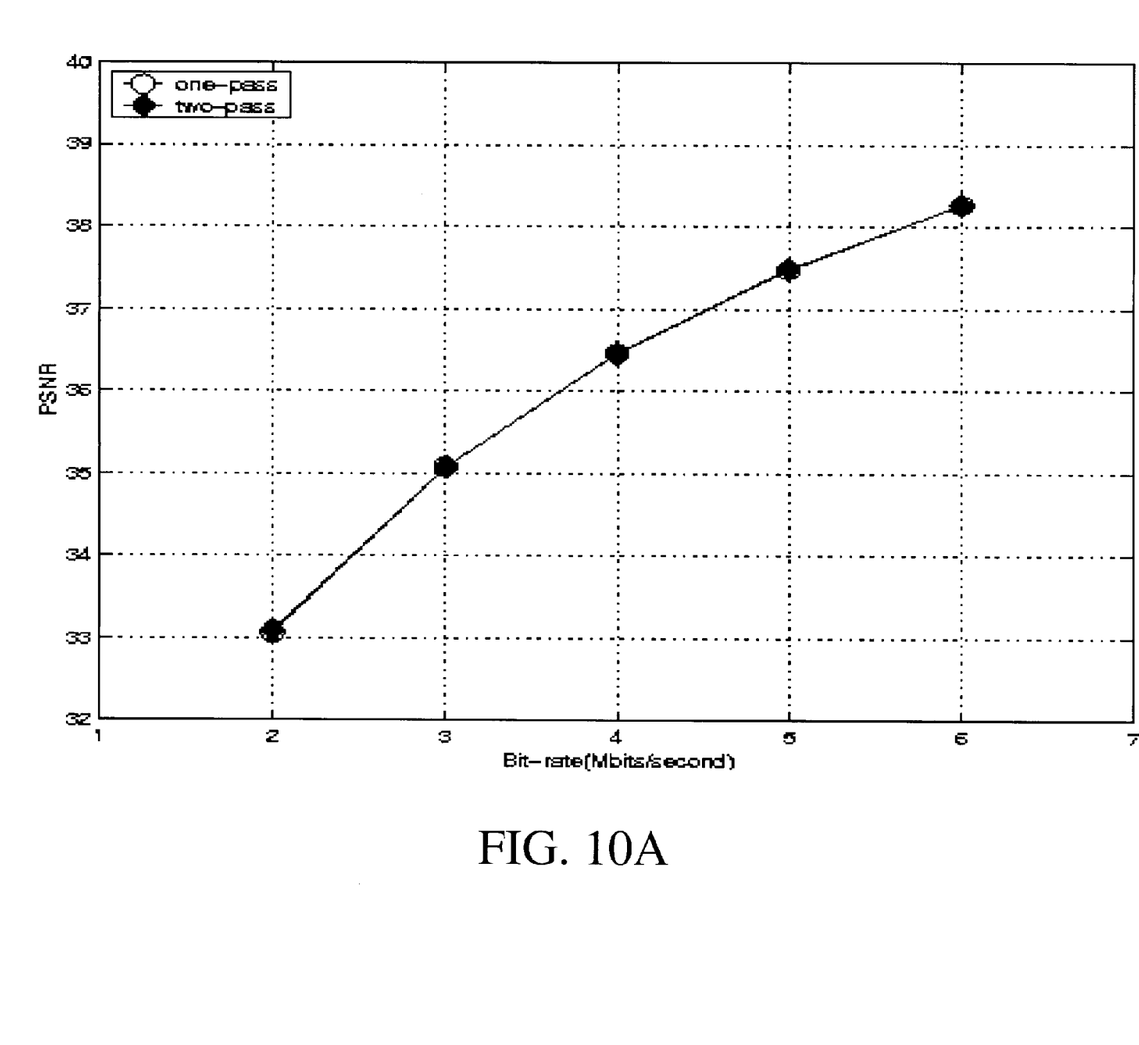
FIG. 10A is a graph comparing decoded quality over a range of bit-rates of the Football video sequence achieved by the two-pass encoder and the one-pass encoder according to the invention.
Figure 10B:
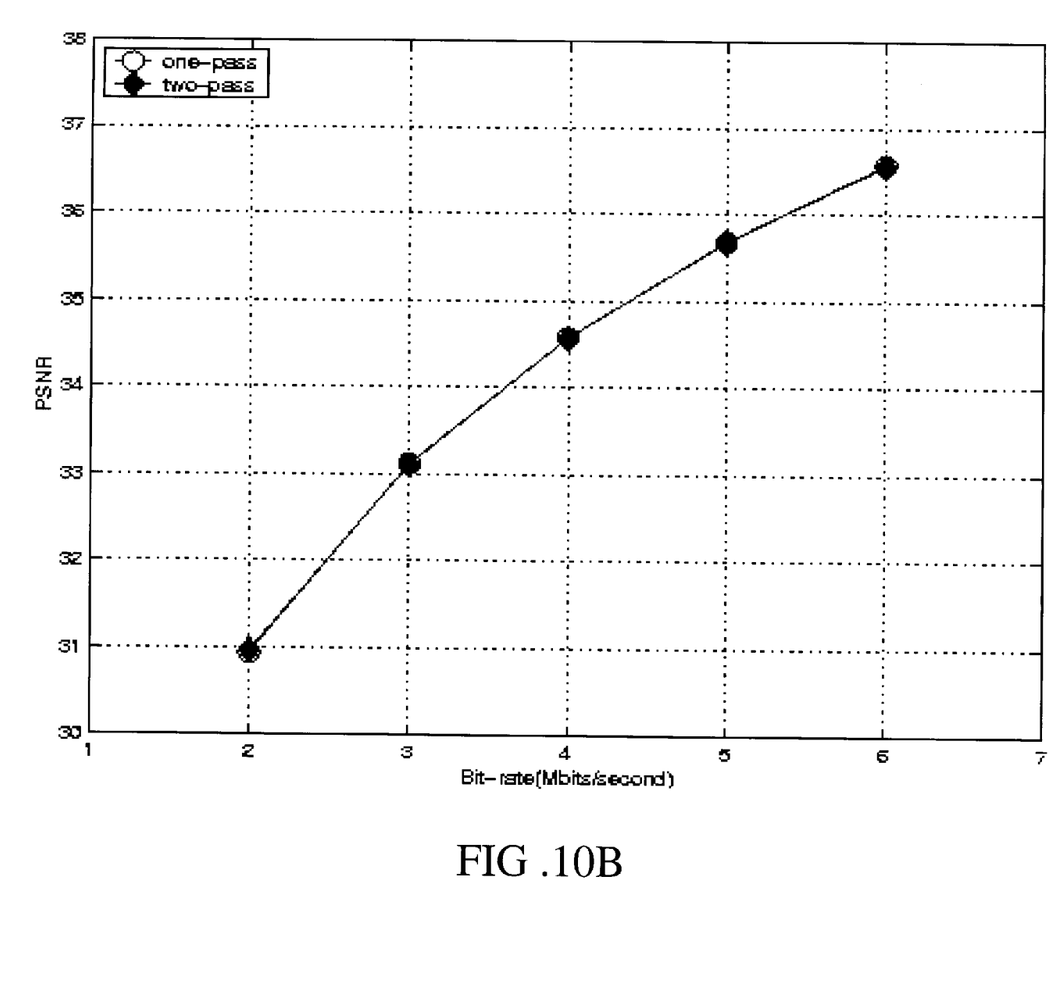
FIG. 10B is a graph comparing decoded quality over a range of bit-rates of the Stefan-Football video sequence achieved by the two-pass encoder and the one-pass encoder according to the invention.

FIGS. 10A and 10B compare the performance of our two-pass and one-pass adaptive field/frame encoding methods. The simulation is conducted on our optimized MPEG-2 encoder with the same conditions as above. Our one-pass method yields similar performance as our two-pass method.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for adaptively encoding a sequence of images, the sequence of images including P-frames and B-frames, comprising:

partitioning the P-frames and B-frames into macroblocks, and extracting motion activity from the macroblocks;

separating each image of the video into a top-field and a bottom-field;

extracting motion activity both from the top-field and from the bottom-field;

initializing an MB field counter and an MB frame counter to zero;

determining a variance of the top-field and a variance of the bottom-field by $$Var = \sum_i (P_i - E(P_i))^2,$$

where $P_i$ denotes a pixel value and $E(P_i)$ denotes a mean value of the corresponding field;

determining a ratio of the two variances; and if Var(top-field)/Var(bottom-field )>Threshold$_1$,
$MB_{13}$field+=1; else if Var(top-field)/Var(bottom-field)<Threshold$_2$, $MB_{13}$field+=1; else
$MB_{13}$frame+=1.; and encoding each image using either frame encoding or field encoding depending on the motion activity extracted from the top-field and the bottom field.

2. The method of claim 1, wherein the top-field includes all odd scan lines of the image, and the bottom-field includes all even scan lines of the image.

3. The method of claim 1 further comprising:

encoding each image with a discrete cosine transform and variable length coding.

4. The method of claim 1 further comprising:

selecting field encoding if $MB_{13}$field>$MD_{13}$frame, and otherwise, selecting frame encoding.

5. The method of claim 1 further comprising:

controlling a rate of each encoded image with a rate control.

6. The method of claim 5 wherein each image includes a plurality of macroblocks and the rate control provides an adaptive quantization parameter for each macroblock.

7. The method of claim 5 wherein the rate control adapt a number of P-frames $N_p$ and a number of B-frames $N_b$ in the sequence of images.

8. A system for adaptively encoding a sequence of images, the sequence of images including P-frames and B-frames, comprising:

means for partitioning the P-frames and B-frames into macroblocks, and extracting motion activity from the macroblocks;

means for separating each image of the video into a top-field and a bottom-field;

means for extracting motion activity from both the top-field and from the bottom-field;

means for initializing an MB field counter and an MB frame counter to zero;

means for determining a variance of the top-field and a variance of the bottom-field by $$Var = \sum_i (P_i - E(P_i))^2,$$

where $P_i$ denotes a vixel value and $E(P_i)$ denotes a mean value of the corresponding field;

means for determining a ratio of the two variances; and if Var(top-field)/Var(bottom-field)>Threshold$_1$, $MB_{13}$field+=1; else if Var(top-field)/Var(bottom-field)<Threshold$_2$, $MB_{13}$field+=1; else $MB$_frame +=1.; and means for encoding each image using either frame encoding or field encoding depending on the extracted motion activity extracted from the top-field and the bottom-field.

* * * * *